United States Patent
Mitchell et al.

(10) Patent No.: US 11,267,829 B2
(45) Date of Patent: Mar. 8, 2022

(54) FUNCTIONAL, PARTIALLY-FLUORINATED SILANES

(71) Applicant: 3M INNOVATIVE PROPERTIES COMPANY, St. Paul, MN (US)

(72) Inventors: Michael H. Mitchell, Woodbury, MN (US); Miguel A. Guerra, Woodbury, MN (US); Tho Q. Nguyen, Bloomington, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 17/274,660

(22) PCT Filed: Dec. 20, 2018

(86) PCT No.: PCT/US2018/066692
§ 371 (c)(1),
(2) Date: Mar. 9, 2021

(87) PCT Pub. No.: WO2020/055444
PCT Pub. Date: Mar. 19, 2020

(65) Prior Publication Data
US 2021/0253608 A1   Aug. 19, 2021

Related U.S. Application Data

(60) Provisional application No. 62/729,240, filed on Sep. 10, 2018.

(51) Int. Cl.
*C07F 7/18* (2006.01)
*C07F 7/12* (2006.01)

(52) U.S. Cl.
CPC ............ *C07F 7/1892* (2013.01); *C07F 7/122* (2013.01)

(58) Field of Classification Search
CPC ........... C07F 7/1892; C07F 7/122; C07F 7/12
See application file for complete search history.

(56) References Cited

U.S. PATENT DOCUMENTS

| | | |
|---|---|---|
| 6,632,585 B1 | 10/2003 | Nakamura |
| 7,081,508 B2 | 7/2006 | Matsuda |
| 2002/0132902 A1 | 9/2002 | Shiono |
| 2004/0175526 A1* | 9/2004 | Corveleyn ............... B32B 7/12 428/36.91 |
| 2013/0108876 A1 | 5/2013 | Komori |

FOREIGN PATENT DOCUMENTS

| | | |
|---|---|---|
| CN | 105593270 A | 5/2016 |
| CN | 105612165 A | 5/2016 |
| CN | 105837822 | 8/2016 |
| JP | 2006-28280 A | 2/2006 |
| WO | WO 2001-008505 | 2/2001 |
| WO | WO 2019-133410 | 7/2019 |

OTHER PUBLICATIONS

XP002790039, Database WPI Week 200617 Thomson Scientific, London, GB, AN 2006-158448.
XP002790040, Database WPI Week 201682 Thomson Scientific, London, GB, AN 2016-52078X.
International Search report for PCT International Application No. PCT/US2018/066692 dated Apr. 15, 2019, 4 pages.

* cited by examiner

*Primary Examiner* — Pancham Bakshi
(74) *Attorney, Agent, or Firm* — Thomas M. Spielbaner

(57) ABSTRACT

Functional, partially-fluorinated silane compound according to Formula (I): wherein: X is $CH_2=CH-$ or $CHCH_2-$; $R_1$ and $R_2$ are linear or branched alkylenes having 1 to 4 carbon atoms; $R_f$ is a perfluoro(alkylene) group having 1 to 8 carbon atoms and, optionally, at least one catenary heteroatom selected from the group consisting of O and N; c is equal to the number of carbon atoms in X; and Y is —Cl or —OR, wherein R is a linear or branched alkyl having 1 to 4 carbon atoms. In some embodiments, Y is $-O(CH_2)_xCH_3$ wherein x is an integer from 0 to 3 are described. Methods of making and using such functional, partially-fluorinated silane compounds are also described

22 Claims, 1 Drawing Sheet

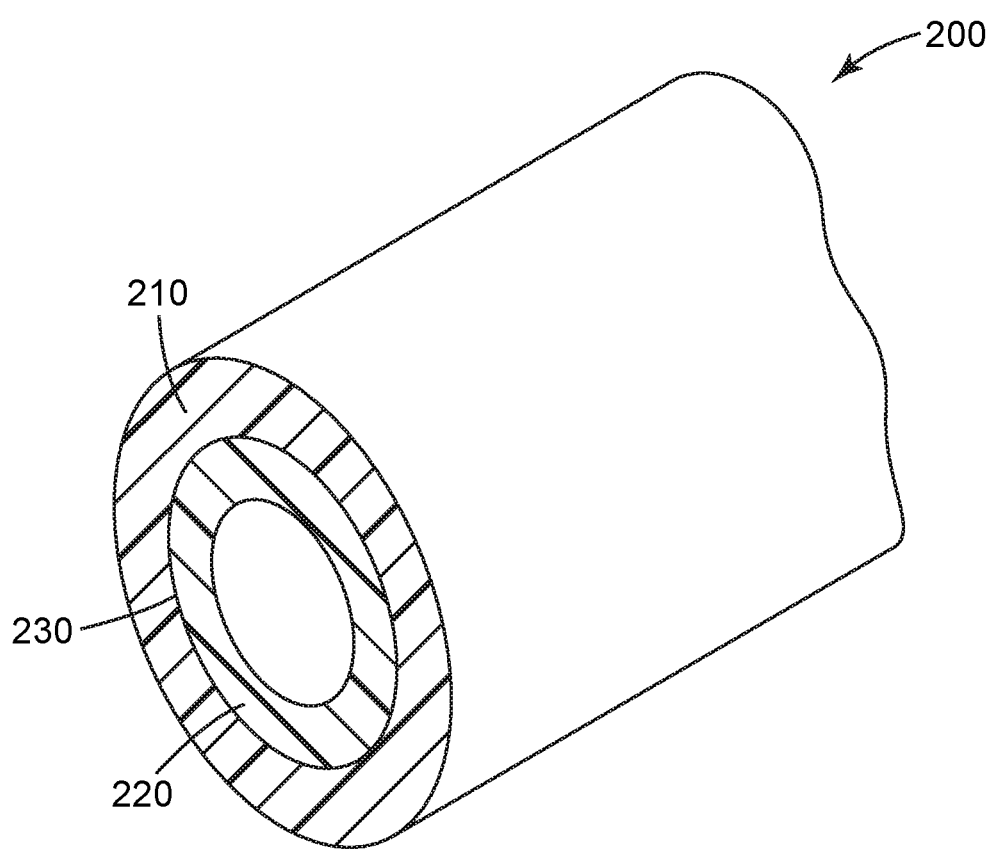

FUNCTIONAL, PARTIALLY-FLUORINATED SILANES

CROSS REFERENCE TO RELATED APPLICATIONS

This application is a national stage filing under 35 U.S.C. 371 of PCT/US2018/066692, filed Dec. 20, 2018, which claims the benefit of Provisional Application No. 62/729, 240, filed Sep. 10, 2018, the disclosure of which is incorporated by reference in their entirety herein.

FIELD

The present disclosure relates to functional, partially-fluorinated silane compounds; methods of preparing these compounds; and uses for such compounds, including as bonding agents.

SUMMARY

Briefly, in one aspect, the present disclosure provides a functional, partially-fluorinated silane compound according to Formula I:

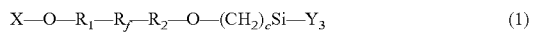  (1)

wherein: X is $CH_2=CH-$ or $CH_2=CHCH_2-$;

$R_1$ and $R_2$ are linear or branched alkylenes having 1 to 4 carbon atoms;

$R_f$ is a perfluoro(alkylene) group having 1 to 8 carbon atoms and, optionally, at least one catenary heteroatom selected from the group consisting of O and N;

c is equal to the number of carbon atoms in X; and

Y is —Cl or —OR, wherein R is a linear or branched alkyl having 1 to 4 carbon atoms. In some embodiments, Y is —O(CH$_2$)$_x$CH$_3$ wherein x is an integer from 0 to 3.

In some embodiments, $R_1$ and $R_2$ are linear alkylenes. In some embodiments, $R_f$ is a linear or branched perfluoro(alkylene) group, e.g., a linear perfluoro(alkylene) group having the formula $(CF_2)_n$, wherein n is an integer from 1 to 4.

In another aspect, the present disclosure provides an article comprising a first composition comprising a fluoropolymer and a second composition comprising a silicone polymer, wherein the second composition is bonded to the first composition. In such articles, at least one of the first or second composition comprises a functional, partially-fluorinated silane compound according to any one of the embodiments of the present disclosure. In some embodiments, the fluoropolymer is a peroxide-curable fluoropolymer.

In another aspect, the present disclosure provides a method of preparing a functional, partially-fluorinated silane compound, the method comprising:

(i) providing a partially-fluorinated dialkene having the formula:

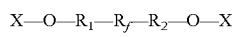

wherein X is $CH_2=CH-$ or $CH_2=CHCH_2-$;

$R_1$ and $R_2$ are linear or branched alkylenes having 1 to 4 carbon atoms; and $R_f$ is a perfluoro(alkylene) group having 1 to 8 carbon atoms and, optionally, at least one catenary heteroatom selected from the group consisting of O and N; and (ii) monohydrosilylating the partially-fluorinated dialkene with trichlorosilane using a platinum catalyst to form a functional, partially-fluorinated, trichlorosilane compound

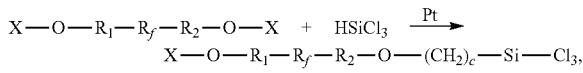

wherein c is equal to the number of carbon atoms in X. In some embodiments, such methods further comprise (iii) reacting the functional, partially-fluorinated, trichlorosilane compound with an alcohol to produce a functional, partially-fluorinated, trialkoxy silane

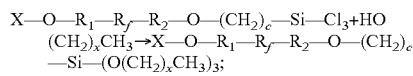

wherein x is an integer from 0 to 3.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWINGS

FIGURE illustrates a bonded article according to some embodiments of the present disclosure.

DETAILED DESCRIPTION

The beneficial properties of fluoropolymers are well known in the art and include high temperature resistance, high chemical resistance, including for example high resistance to solvents, fuels and corrosive chemicals, and non-flammability. Because of these beneficial properties, fluoropolymers find wide application particularly where materials are exposed to high temperatures or aggressive chemicals. For example, because of their excellent resistance to fuels and their good barrier properties, fluoropolymers are commonly used in fuel management systems including fuel tanks, and fuel lines (e.g., fuel filler lines and fuel supply lines).

Fluoropolymers are generally more expensive than polymers that do not contain fluorine. To reduce the overall cost of an article, materials have been developed in which the fluoropolymer is used in combination with other materials. For example, hoses containing fluoropolymers are typically prepared as multi-layer articles using a relatively thin layer of a fluoropolymer, typically a fluoroelastomer, at the interface where chemical resistance is required, such as an inner or an outer layer. The other layers of such multi-layer hoses typically contain non-fluorine containing elastomers, such as silicone-containing polymers. One requirement of those layered articles is a firm and reliable bond between the fluoropolymer layer and its adjacent layer(s). However, satisfactory bonding of a fluoropolymer to other polymers, particularly silicones, is often difficult, particularly after prolonged exposure at elevated temperatures.

Fluorochemicals having a functional group can be useful as intermediates in a wide variety of applications. Their usefulness may be due to properties they can impart, including for example thermal resistance, chemical resistance, or both; oleophobicity, hydrophobicity, or both; or combinations thereof.

Silanes can be useful as crosslinking agents to crosslink polymers thereby improving tear resistance, elongation at break, abrasion resistance, or combinations thereof. Silane coupling agents bind to minerals or silica type fillers resulting in improvements in mixing, bonding of fillers to polymers, matrix strength, or combinations thereof. Silanes can also adhere fibers such as glass fibers, carbon fibers, or both to certain polymers to make the matrix compatible. Additional applications include water repellency, usefulness in adhesives to repel water, masonry protection, graffiti control and as sealants.

Disclosed herein are compounds including a silane group, a partially-fluorinated group and a functional group. The silane group and the fluorinated group provide advantageous properties and the functional group provides chemical functionality to disclosed compounds. For example, in some embodiments, the functional group can be chosen such that the compound can be polymerized (either with itself or additional monomer(s)), the compound can function as a chain-transfer agent, the compound can function as a curative, or some combination thereof. In some embodiments, the functional group can be chosen such that the compound can function as a bonding agent to bond a fluoropolymer composition to other substrates, including, e.g., silicone compounds.

Generally, the compound is a functional, partially-fluorinated silane compound according to Formula I:

$$X-O-R_1-R_f-R_2-O-(CH_2)_c Si-Y_3 \quad (1)$$

wherein: X is $CH_2=CH-$ or $CH_2=CHCH_2-$;

$R_1$ and $R_2$ are linear or branched alkylenes having 1 to 4 carbon atoms;

$R_f$ is a perfluoro(alkylene) group having 1 to 8 carbon atoms and, optionally, at least one catenary heteroatom selected from the group consisting of O and N;

c is equal to the number of carbon atoms in X; and

Y is —Cl or —OR, wherein R is a linear or branched alkyl having 1 to 4 carbon atoms. In some embodiments, Y is $-O(CH_2)_x CH_3$ wherein x is an integer from 0 to 3.

Independent of other selections, in some embodiments, $R_1$ and $R_2$ are linear alkylenes, and the compound is a functional, partially-fluorinated silane compound according to Formula II:

$$X-O-(CH_2)_a-R_f-(CH_2)_b-O-(CH_2)_c Si-Y_3 \quad (II)$$

wherein a and b are integers from 1 to 4.

In some embodiments, a is equal to b. In some embodiments, a and b are both 1, and the compound is a functional, partially-fluorinated silane compound according to Formula III:

$$X-O-CH_2-R_f-CH_2-O-(CH_2)_c Si-Y_3 \quad (III)$$

wherein X, $R_f$, c, and Y are as defined herein for Formula 1.

Independent of other selections, in some embodiments, $R_f$ is a linear or branched perfluoro(alkylene) group, e.g., a linear perfluoro(alkylene) group having the formula $(CF_2)_n$ wherein n is an integer from 1 to 8. In some embodiments, it may be desirable to limit the number of F groups relative to the number of H groups. In some embodiments, n is 1 to 4, e.g., 2 to 4. In some embodiments, X is a vinyl group ($CH_2=CH-$) and n is 2 or 3. In some embodiments, X is an allyl group ($CH_2=CH-CH_2-$) and n is 2 to 4, e.g. n is 2 or 3. In some embodiments, $R_f$ comprises at least 5 carbon atoms, and five or six carbon atoms of $R_f$ are bonded together to form a ring.

Independent of other selections, in some embodiments, Y is $-O(CH_2)_x CH_3$. In some embodiments, x is 0 or 1, i.e., Y is selected from the group consisting of $-OCH_3$ and $-OCH_2CH_3$.

One exemplary method of making useful functional, partially-fluorinated silane compounds begins with a diol comprising the fluorinated group ($R_f$) according to the following formula: $HO-R_1-R_f-R_2-OH$. The diol is reacted to produce an intermediate having the desired functional group (X) on opposite ends, i.e., $X-O-R_1-R_f-R_2-O-X$, where X has a terminal alkene group. In some embodiments, $R_1$ and $R_2$ are the same, and symmetrical materials are produced.

In some embodiments, the diol may be reacted with a halide or acetate of the desired functional group. Such reactants have the general formula X—Z, where X is the desired functional group (i.e., a vinyl or allyl group) and Z is a halide or $-OC(O)CH_3$. In some embodiments, Z is selected from the group consisting of Br, Cl, I and $-OC(O)CH_3$. In some embodiments, X is an allyl group and Z is a halide, e.g., Z is Br. In some embodiments, X is a vinyl group and Z is $-OC(O)CH_3$.

This intermediate may then be monohydrosilylated with trichlorosilane using a platinum catalyst. This synthetic method is illustrated by the generic Scheme 1 below, where X is $CH_2=CH-CH_2-$

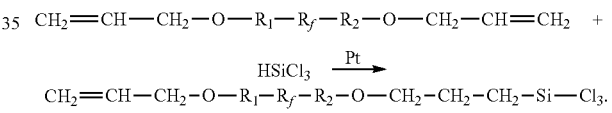

In some methods, such trichlorosilane compounds can be reacted with an alcohol to produce easier to handle trialkoxy silanes. This synthetic method is illustrated by the generic Scheme 2 below using a linear alcohol as an exemplary alcohol.

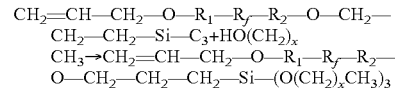

wherein x is as defined herein for Formula I.

Examples of functional, partially fluorinated silane compounds of the present disclosure include the following compounds and their trialkoxysilane and trichlorosilane analogs:

| | |
|---|---|
| AECC4CEPTMS | $CH_2=CHCH_2-O-CH_2-C_4F_8-CH_2-O-CH_2CH_2CH_2-Si(OCH_3)_3$ |
| AECC3CEPTMS | $CH_2=CHCH_2-O-CH_2-C_3F_6-CH_2-O-CH_2CH_2CH_2-Si(OCH_3)_3$ |
| AECC2CEPTMS | $CH_2=CHCH_2-O-CH_2-C_2F_4-CH_2-O-CH_2CH_2CH_2-Si(OCH_3)_3$ |
| VECC4CEETMS | $CH_2=CH-O-CH_2-C_4F_8-CH_2-O-CH_2CH_2-Si(OCH_3)_3$ |
| VECC3CEETMS | $CH_2=CH-O-CH_2-C_3F_6-CH_2-O-CH_2CH_2-Si(OCH_3)_3$ |
| VECC2CEETMS | $CH_2=CH-O-CH_2-C_2F_4-CH_2-O-CH_2CH_2-Si(OCH_3)_3$ |

The functional, partially fluorinated silane compounds of the present disclosure were found to improve the bond between a fluoropolymer-containing composition and a silicone-containing composition. The partially-fluorinated silane bonding agent may be included in either one or both compositions.

The first composition contains at least one fluoropolymer. In some embodiments, the composition consists of one or more fluoropolymers. In some embodiments, the first composition contains at least 50% by weight, at least 75%, at least 80%, at least 90%, or even at least 95% by weight of fluoropolymer(s) based on the total weight of the first composition.

The fluoropolymer may have a partially or fully fluorinated backbone. Suitable fluoropolymers are those that have a backbone that is at least 30% by weight fluorinated, preferably at least 50% by weight fluorinated, more preferably at least 65% by weight fluorinated. Examples of fluoropolymers include polymers and copolymers of one or more fluorinated monomers optionally in combination with one or more non-fluorinated monomers. Examples of fluorinated monomers include fluorinated C2-C8 olefins that may or may not have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF), fluorinated alkyl vinyl monomers such as hexafluoropropylene (HFP); fluorinated vinyl ethers, including perfluorinated vinyl ethers (collectively referred to as PVE) and fluorinated allyl ethers including perfluorinated allyl ethers (collectively referred to as PAE). Suitable non-fluorinated comonomers include vinyl chloride, vinylidene chloride and C2-C8 olefins such as ethylene (E) and propylene (P).

In some embodiments, the fluoropolymer is substantially amorphous. This means the polymer has no melting point or no distinct melting point but rather a melting range extending over at least 10° C., for example a melting range of from 270 to 285° C. Amorphous fluoropolymers include, for example, copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, TFE-P, VDF-TFE-HFP, VDF-TFE-PVE, TFE-PVE, E-TFE-PVE and any of the aforementioned copolymers further including units derived from a chlorine containing monomer such as CTFE. Still further examples of suitable amorphous copolymers include copolymers having a combination of monomers as in CTFE-P.

In some embodiments, the amorphous fluoropolymers comprise from 20 to 85%, preferably 50 to 80% by moles of repeating units derived from VDF and TFE, which may or may not be copolymerized with one or more other fluorinated ethylenically unsaturated monomer, such as HFP and/or one or more non-fluorinated C2-C8 olefins, such as ethylene and propylene.

When included, the units derived from the fluorinated ethylenically unsaturated comonomer are generally present at between 5 and 45 mole %, e.g., between 10 and 40 mole %, based on the total moles of comonomers in the fluoropolymer. When included, the units derived from the non-fluorinated comonomers are generally present at between 1 and 50 mole %, e.g., between 1 and 30 mole %, based on the total moles of comonomers in the fluoropolymer.

In some embodiments, the fluoropolymers are curable and can be cross-linked. In some embodiments, the fluoropolymers are already elastic or become elastic after curing or their elasticity can be improved by curing. Typically, elastic polymers can be stretched upon application of a force but retain their original shape once that force is no longer applied.

In some embodiments, the fluoropolymers are curable by a peroxide curing reaction. This means the fluoropolymers are curable by one or more peroxide curing agents or the radicals generated by the peroxide curing agents. Peroxide curatives include organic or inorganic peroxides. Organic peroxides are preferred, particularly those that do not decompose during dynamic mixing temperatures.

Examples of the organic peroxides include benzoyl peroxide, dicumyl peroxide, di-tert-butyl peroxide, 2,5-dimethyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, 0,0'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide.

In some embodiments, a coagent, e.g., a crosslinking aid can be used in addition to the peroxide. Suitable coagents include, for example, bisolefins (such as $CH_2=CH(CF_2)_6CH=CH_2$, and $CH_2=CH(CF_2)_8CH=CH_2$), diallyl ether of glycerin, triallylphosphoric acid, diallyl adipate, diallylmelamine, triallyl isocyanurate (TAIC), fluorinated TAIC comprising a fluorinated olefinic bond, tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide.

In some embodiments, the peroxide-curable fluoropolymer comprises a curesite group selected from the group consisting of Br, I, CN or a combination thereof. Such curesite groups may be incorporated into the fluoropolymer using any of a variety of known means. For example, a curesite monomer (CSM) may be used. Generally, any known CSM comprising a bromo-group, an iodo-group, or a cyano-group may be used. Such CSMs are well-known, as are their methods of incorporation into fluorinated polymers. Alternatively, or in addition, curesite groups may be introduced using chain transfer agents that comprise a bromo-group, an iodo-group, or a cyano-group. Such chain transfer agents are well-known, as are their methods of incorporation into fluorinated polymers.

The fluoropolymers can be made in accordance with any of the known polymerization methods for making fluoropolymers. Such methods include without limitation, aqueous emulsion polymerization, suspension polymerization and polymerization in an organic solvent.

The first composition may be prepared by mixing one or more fluoropolymers with additional ingredients in conventional rubber processing equipment. Such equipment includes rubber mills, internal mixers, such as Banbury mixers, and mixing extruders.

Exemplary additional ingredients may include, for example, curing agents, coagents, and acid-acceptors. Other additional ingredients may also include, for example, carbon black, stabilizers, plasticizers, lubricants, fillers, and processing aids typically utilized in fluoropolymer compounding, provided they have adequate stability for the intended service conditions.

The second composition contains at least one silicone polymer. In some embodiments, the second composition consists of one or more silicone polymers. In some embodiments, the second composition contains at least 50% by weight, at least 75%, at least 80%, at least 90%, or even at least 95% by weight of silicone polymer(s) based on the total weight of the second composition.

In some embodiments, the silicone polymer is a polysiloxane. A polysiloxane comprises repeating —Si—O—Si— units. In some embodiments, the polysiloxanes comprise polydimethylsiloxane. The silicone-containing polymers are preferably curable. In some embodiments, the curable polymers become elastic upon curing or their elastic properties are increased upon curing. Cured or partially cured silicone-containing polymers (also referred to as "silicone rubbers") are generally elastomeric, which means they have elastic properties.

In addition to the silicone polymer(s), the second composition may contain curing agents, catalysts and crosslinkers. The silicone polymer composition may further include other additives, such as, for example, fillers, process aids, antioxidants, pigments and the like to obtain certain performance characteristics. For example, silica, e.g., fumed silica, is a common filler used to reinforce strength properties. Other common additives include precipitated silica, titanium dioxide, calcium carbonate, magnesium oxide and ferric oxide.

In some embodiments, the silicones are curable by a peroxide curing reaction. This means the silicones are curable by one or more peroxide curing agents or the radicals generated by the peroxide curing agents. Coagents may be used in combination with peroxide curing agent(s).

A composition containing one or more silicone-containing polymers may be prepared, for example, by mixing the ingredients in conventional rubber processing equipment. Such equipment includes rubber mills, internal mixers, such as Banbury mixers, and mixing extruders.

In some embodiments, the first composition includes a bonding agent according to the present disclosure. In some embodiments, the second composition includes a bonding agent according to the present disclosure. In some embodiments, both the first and the second composition include a bonding agent according the present disclosure.

In some embodiments, the same bonding agent is used in both the first and second compositions. In some embodiments, bonding agents used in the first and second composition are independently selected, e.g., to achieve the desired compatibility.

The optimum amounts of the functional, partially fluorinated silane compounds to be used typically depend on the nature of the bonding agent and the other components of the composition to which the bonding agent is added. Optimum amounts can be readily determined by routine experimentation.

When added to the fluoropolymer composition, typical amounts of bonding agent are between 0.1 and 10% by weight, preferably between 0.5 and 5% by weight, based on the weight of fluoropolymer. When added to the silicone composition, the bonding agent is generally used in an amount of 0.1 to 15% by weight, preferably between 1 and 10% by weight, based on the weight of silicone in the composition. When added to both the fluoropolymer composition and the silicone composition, the bonding agent is generally used in an amount of 0.1 to 5% by weight in the fluoropolymer composition (based on the weight of the fluoropolymer in the composition) and in an amount of 0.1 to 10% by weight in the silicone composition (based on the weight of the silicone polymer in the composition).

In some embodiments, the first composition is a solid composition. For example, the first composition may be formed into a sheet, a layer, a laminate, a tube, or other article. In some embodiments, the second composition is a solid composition. For example, the second composition may be formed a sheet, a layer, a laminate, a tube, or other article.

The compositions may then be laminated together in the presence of the bonding agent using effective heat and pressure for an effective time to create a strong bond. As is known by one of ordinary skill, the effective amount of heat, pressure, and time are interrelated, and may also depend in the specific fluoropolymer and silicone compositions. Effective and optimum bonding conditions may be determined by routine experimentation.

For example, bonding may be achieved by contacting the first and second compositions such that a common interface is formed. The compositions are then subjected to conditions such that at least the fluoropolymer cures. In some embodiments, the silicone polymer may also cure. It may be sufficient to cure locally, i.e. to cure only the parts of the compositions that form the common interface.

In some embodiments, curing and bonding may be achieved by heating the first composition while it is in contact with second composition to a temperature of 120° C. to 200° C. for 1 to 120 minutes (e.g., 140° C. to 180° C. for 3 to 60 minutes). In some embodiments, the heating may be carried out while simultaneously applying pressure, e.g., at least 5 MPa, at least 10 MPa, or even at least 25 MPa. Generally, pressures greater than 200 MPa are not required. In some embodiments, the pressure is no greater than 100, e.g. no greater than 50 MPa.

Alternatively, both compositions may be contacted in molten form, for example, during co-extrusion or injection molding. It is also possible to coat one of the compositions onto the other. For example, one of the compositions may be a liquid or in the form of a liquid coating composition. Such a composition may be applied as a coating to the other composition, which may be provided in the form of, e.g., a layer, a sheet, a film a laminate, a tube or other article.

Alternative methods of forming multilayer articles include coextrusion, sequential extrusion, and injection molding to name a few. It is also possible to prepare a multilayer article by a repeated cycle of coating a liquid silicone polymer composition onto a layer of a fluoropolymer composition. It is also possible to form one or more of the individual layers by extrusion coating, e.g., using a crosshead die.

The heat and pressure of the method by which the layers are brought together (e.g. extrusion or lamination) can be sufficient to provide adequate adhesion between the layers. It may, however, be desirable to further treat the resulting article, for example, with additional heat, pressure, or both, to enhance the bond strength between the layers and to post cure the laminate. One way of supplying additional heat when the multi-layer article is prepared by extrusion is by delaying the cooling of the multi-layer article at the conclusion of the extrusion process.

Alternatively, additional heat energy can be added to the multi-layer article by laminating or extruding the layers at a temperature higher than necessary for merely processing the components. As another alternative, the finished multi-layer article can be held at an elevated temperature for an extended period of time. For example, the finished article can be placed in a separate apparatus for elevating the temperature of the article such as an oven, an autoclave or heated liquid bath. Combinations of these methods can also be used.

An exemplary article according to some embodiments of the present disclosure, in the form of a simple two-layer hose, is shown in the FIGURE. Article (200) comprise first layer (210), bonded to second layer (220) at interface (230). First layer (210) comprises the first composition, i.e., the fluoropolymer containing composition. Second layer (220) comprises the second composition, i.e., the silicone polymer containing composition. One or both the first and second compositions comprise a partially-fluorinated silane bonding agent of the present disclosure.

Any article in which a fluoropolymer containing layer is bonded to the silicone polymer layer can be made. Such articles include hoses, tubes, O-rings, seals, diaphragms, valves, containers or simple laminates. Those articles may be used, for example in motor vehicles, such as motor crafts, aircrafts and water crafts and include turbo charger hoses, fuel lines, fuel tanks and the like. Articles may also be used in medical applications, for examples as tubes, hoses or lining in a medical apparatus or valves, O-rings and seals in a medical apparatus or device.

Hoses can be made in which a layer of fluoropolymer (typically an elastomer), generally as an innermost layer, is bonded to a silicone polymer (typically a silicone rubber), as the outer layer or as a middle layer.

The following examples are provided to illustrate certain embodiments but are not meant to be limiting in any way. Unless specified otherwise, percentages are percentages by weight with respect to the mass of the total compositions and add up in each case to 100 weight percent.

Examples. The materials used to prepare the samples are summarized in Table 1.

TABLE 1

Summary of materials used in the preparation of the examples.

| Name | Description | Trade Name and Source |
|---|---|---|
| FPO3620 | Peroxide curing fluoropolymer (67.5% F terpolymer, 20 MV, with iodine end groups) | Available from 3M. |
| Silicone-PO | Peroxide curing silicone rubber | Available from Wacker Chemie AG, Munchen, DE under the trade designation "ELASTOSIL R760/70" |
| CB | Carbon black | THERMAX N990 ULTRA PURE, Cancarb Ltd, Medicine Hat, AB, Canada |
| TAIC | Triallyl-isocyanurate | TAIC, Nippon Kasei Chemical Co. Ltd., Tokyo, Japan |
| DBPH | 2,5-dimethyl-2,5-di(t-butylperoxy)-hexane, about 50% active on an inert carrier | VAROX DBPH-50, Vanderbilt Chemicals, LLC., Norwalk, CT. |
| DCP | Dicumyl peroxide | DiCup 40C, Harwick Standard, Akron, OH. |

Functional, partially-fluorinated silanes were prepared as follows.

AECC4CEPTMS: $CH_2\!=\!CHCH_2\!-\!O\!-\!CH_2\!-\!C_4F_8\!-\!CH_2\!-\!O\!-\!CH_2CH_2CH_2\!-\!Si(OCH_3)_3$

In a 2 L 3-neck round bottom flask equipped with a mechanical stirrer, thermocouple and condenser was charged with 200 g (0.76 mol) $HO\!-\!CH_2\!-\!C_4F_8\!-\!CH_2\!-\!OH$ (a C6 diol available from Exfluor Research Corp.), 302 g (2.5 mol) allyl bromide, 30 g (0.1 mol) tetrabutylammonium bromide dissolved in 10 g DI water and 500 g MTBE solvent and stirred. The solution was heated to 50° C. and 124 g (1.88 mol) KOH dissolved in 88 g of DI water were added dropwise. After this addition, the mixture was refluxed for 30 minutes at 56° C. The mixture was cooled to 25° C. and 100 g NaCl dissolved in 300 g DI water was added and stirred. The mixture phase split with the desired product in the top phase. Vacuum distillation isolated 249 g (0.73 mol) of $CH_2\!=\!CHCH_2\!-\!O\!-\!CH_2C_4F_8CH_2\!-\!O\!-\!CH_2CH\!=\!CH_2$ boiling at 95° C. and 1 mm Hg for a 96% yield.

To a 500 ml 3-neck round bottom flask containing a magnetic stir bar was charged with 249 g (0.73 mol) of the $CH_2\!=\!CHCH_2\!-\!O\!-\!CH_2C_4F_8CH_2\!-\!O\!-\!CH_2CH\!=\!CH_2$ and 35 g (0.26 mol) of $HSiCl_3$ available from Aldrich. The mixture was stirred and 1 ml of a 2.4 weight % Pt as platinum-divinyltetramethyl disiloxane complex available from Gelest, Inc. was added. The reaction was exothermic to 81° C. The reaction was completed after 30 minutes and the temperature was cooled to 25° C. Vacuum distillation recovered 143 g excess of the fluorochemical diallyl ether followed by isolation of 122 g (0.26 mol) of $CH_2\!=\!CHCH_2\!-\!O\!-\!CH_2C_4F_8CH_2\!-\!O\!-\!CH_2CH_2CH_2\!-\!SiCl_3$ (AECC4CEPTCS) boiling at 128° C. at 2 mm Hg for a quantitative yield. NMR confirmed the compound.

To a 250 ml 3-neck round bottom flask containing a magnetic stir bar, thermocouple and condenser was charged with 55 g of excess methanol available from Aldrich. The methanol was stirred and 122 g (0.26 mol) of the $CH_2\!=\!CHCH_2\!-\!O\!-\!CH_2C_4F_8CH_2\!-\!O\!-\!CH_2CH_2CH_2\!-\!SiCl_3$, were added drop wise. The reaction was stirred at 25° C. for 15 minutes, then vacuum distilled isolating 76 g (0.16 mol) of $CH_2\!=\!CHCH_2\!-\!O\!-\!CH_2C_4F_8CH_2\!-\!O\!-\!CH_2CH_2CH_2\!-\!Si(OCH_3)_3$ (AECC4CEPTMS) boiling at 130° C. and 2 mm Hg, for a 62% yield. NMR confirmed the compound.

AECC3CEPTMS: $CH_2\!=\!CHCH_2\!-\!O\!-\!CH_2\!-\!C_3F_6\!-\!CH_2\!-\!O\!-\!CH_2CH_2CH_2\!-\!Si(OCH_3)_3$

A 5 L 3-neck round bottom flask equipped with a mechanical stirrer, thermocouple and condenser was charged with 500 g (2.4 mol) $HO\!-\!CH_2\!-\!C_3F_6\!-\!CH_2\!-\!OH$ (a C5-diol available from Exfluor Research Corp.), 859 g (7.2 mol) allyl bromide, 17 g (0.05 mol) tetrabutylammonium bromide dissolved in 10 g DI water and 600 g glyme solvent. The solution was stirred, heated to 50° C., and had 465 g (7.1 mol) KOH dissolved in 300 g of DI water added dropwise. After addition, the mixture was heated for 30 minutes at 80° C. The reaction was cooled to 25° C. and 500 g DI water was added and stirred. Vacuum distillation of the phase-split top phase isolated 625 g (2.14 mol) of $CH_2\!=\!CHCH_2\!-\!O\!-\!CH_2C_3F_6CH_2\!-\!O\!-\!CH_2CH\!=\!CH_2$, a fluorochemical diallyl ether boiling at 92° C. at 10 mm Hg for a 91% yield.

A 2 L 3-neck round bottom flask equipped with a mechanical stirrer, thermocouple and condenser was charged with 625 g (2.14 mol) $CH_2\!=\!CHCH_2\!-\!O\!-\!CH_2C_3F_6CH_2\!-\!O\!-\!CH_2CH\!=\!CH_2$ and 115 g, (0.85 mol) of $HSiCl_3$ available from Aldrich. The mixture was stirred and 0.2 g of a 2.4 weight % Pt as platinum-divinyltetramethyl disiloxane complex available from Gelest, Inc. was added. The reaction was exothermic to 100° C. The reaction was completed after 30 minutes and the temperature cooled to 25° C. Vacuum distillation recovered 407 g excess fluorochemical diallyl ether followed by isolation of 285 g (0.67 mol) of CH₂=CHCH₂—O—CH₂C₃F₆CH₂—O—CH₂CH₂CH₂—SiCl₃ (AECC3CEPTCS) boiling at 152° C. at 10 mm Hg for a 79% yield. NMR confirmed the compound.

In a 1 L 3-neck round bottom flask equipped with a mechanical stirrer, thermocouple and condenser was charged with 200 g excess methanol. The methanol was stirred and 285 g (0.67 mol) of CH₂=CHCH₂—O—CH₂C₃F₆CH₂—O—CH₂CH₂CH₂—SiCl₃ was added drop wise. The reaction was stirred at 25° C. for 15 minutes and vacuum distillation isolated 143 g (0.35 mol) of CH₂=CHCH₂—O—CH₂C₃F₆CH₂—O—CH₂CH₂CH₂—Si(OCH₃)₃ (AECC3CEPTMS), boiling at 158° C. at 10 mm Hg for a 52% yield. NMR confirmed the compound.

AECC2CEPTMS: CH₂=CHCH₂—O—CH₂—
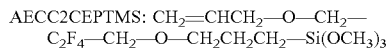

A 3 L 3-neck round bottom flask equipped with a mechanical stirrer, thermocouple and condenser was charged with 110 g (2.9 mol) of NaBH₄ and 500 g isopropanol. The mixture was stirred and cooled to 5° C. A charge of 257 g (1.3 mol) F(O)C—C₂F₄—C(O)F (perfluoroadipoyl fluoride available from Exfluor Research Corp) was added over two hours. The reaction mixture was then heated and stirred for an hour at 80° C., then allowed to cool to 25° C. Next, 750 g of 33% sulfuric acid was added dropwise over one hour and the temperature increased 35° C. IPA solvent was atmospheric distilled with the reaction heated to 102° C. The reactor was cooled to 25° C. Then 250 g MTBE solvent was added and stirred followed by isolation of top product phase. MTBE was removed by rotary evaporation followed by vacuum distillation to isolate 110 g (0.68 mol) of HO—CH₂—C₂F₄—CH₂OH (a C₄ diol), boiling at 98° C. at 10 mm Hg for a 53% yield confirmed by H- and F-NMR.

A 2 L 3-neck round bottom flask equipped with a mechanical stirrer, thermocouple and condenser was charged with 110 g (0.68 mol) HO—CH₂—C₂F₄—CH₂OH, 266 g (2.2 mol) allyl bromide, 7 g (0.02 mol) tetrabutylammonium bromide dissolved in 5 g DI water and 400 g MTBE solvent, The solution was stirred, heated to 50° C. and had 135 g (2.2 mol) KOH dissolved in 100 g of DI water added dropwise. After addition, the mixture was refluxed for 30 minutes at 56° C. The reaction was cooled to 25° C. Phased split top phase and MTBE were removed by rotary evaporation followed by vacuum distillation to isolate 121 g (0.5 mol) of CH₂=CHCH₂—O—CH₂C₂F₄CH₂—O—CH₂CH=CH₂, a fluorochemical diallyl ether boiling at boiling at 80° C. at 11 mm Hg for a 74% yield.

A 500 ml 3-neck round bottom flask containing a magnetic stir bar was charged with 120 g (0.5 mol) of CH₂=CHCH₂—O—CH₂C₂F₄CH₂—O—CH₂CH=CH₂, and 25 g (0.19 mol) of HSiCl₃ available from Aldrich. The mixture was stirred and 0.2 g of a 2.4 weight % Pt as platinum-divinyltetramethyl disiloxane complex available from Gelest, Inc. was added. The reaction was exothermic to 90° C. The reaction was completed after 30 minutes and the temperature cooled to 25° C. Vacuum distillation recovered 77 g excess fluorochemical diallyl ether followed by isolation of 68 g (0.18 mol) of CH₂=CHCH₂—O—CH₂C₂F₄CH₂—O—CH₂CH₂CH₂—SiCl₃ (AECC2CEPTCS) boiling of 140° C. at 11 mm Hg for a quantitative yield. NMR confirmed the compound.

A 250 ml 3-neck round bottom flask containing a magnetic stir bar, thermocouple and condenser was charged with 30 g excess methanol available from Aldrich. The methanol was stirred and 60 g (0.16 mol) of CH₂=CHCH₂—O—CH₂C₂F₄CH₂—O—CH₂CH₂CH₂—SiCl₃ was added dropwise. The reaction was stirred at 25° C. for 15 minutes and vacuum distillation isolated 40 g (0.11 mol) of CH₂=CHCH₂—O—CH₂C₂F₄CH₂—O—CH₂CH₂CH₂—Si(OCH₃)₃ (AECC2CEPTMS) boiling at 148° C. at 10 mm Hg for a 69% yield. H- and F-NMR confirmed the compound.

Fluoropolymers with and without a functional, partially-fluorinated silane compound were prepared by compounding the materials listed in Table 2 on a two-roll mill. Similarly, silicones with and without a functional, partially-fluorinated silane compound were prepared by compounding the materials listed in Table 3 on a two-roll mill.

TABLE 2

Compositions of fluoropolymers.

| Material | FP-A1 | FP-B1 | FP-B2 | FP-B3 |
|---|---|---|---|---|
| FP3620 | 100 | 100 | 100 | 100 |
| CB | 30 | 30 | 30 | 30 |
| TAIC | 3 | 3 | 3 | 3 |
| DBPH | 2 | 2 | 2 | 2 |
| AECC4CEPTMS | 0 | 2 | 0 | 0 |
| AECC3CEPTMS | 0 | 0 | 2 | 0 |
| AECC2CEPTMS | 0 | 0 | 0 | 2 |

TABLE 3

Compositions of silicone polymers.

| Material | SP-A1 | SP-B1 | SP-B2 | SP-B3 |
|---|---|---|---|---|
| Silicone-PO | 100 | 100 | 100 | 100 |
| DCP | 1 | 1 | 1 | 1 |
| AECC4CEPTMS | 0 | 2 | 0 | 0 |
| AECC3CEPTMS | 0 | 0 | 2 | 0 |
| AECC2CEPTMS | 0 | 0 | 0 | 2 |

Examples were prepared by taking 50 g of a selected fluoropolymer compound and 50 grams of a selected silicone compound, then pressing these samples together at 171° C. (340° F.) at 138 MPa (10 tons) for 10 minutes. Samples were post cured at 200° C. (392° F.) for 4 hours. Once post cured, the samples were exposed to thermal aging at 232° C. (450° F.) for 2 hours.

The laminated samples included unbonded tabs of both the fluoropolymer layer and the silicone layer. The bond between the fluoropolymer composition and the silicone composition was tested by inserting these tabs in the opposite jaws on and MTS Tensile Tester and then separating the jaws in an attempt to peel the bonded compositions apart.

If either the fluoropolymer of the silicone tore, it indicated that the bond between the compositions exceeded the internal strength of the compositions. This resulted in a "Pass" rating. If, instead, failure occurred at the interface between the fluoropolymer and silicone compositions, a "Fail" rating was assigned. The results are summarized in Tables 4a-4c.

TABLE 4a

Bonding results using the AECC4CEPTMS functional, partially-fluorinated silane.

| Sample | EX-1 | EX-2 | EX-3 | CE-1 |
|---|---|---|---|---|
| Fluoropolymer | FP-A1 | FP-B1 | FP-B1 | FP-A1 |
| Silicone | SP-B1 | SP-A1 | SP-B1 | SP-A1 |

TABLE 4a-continued

Bonding results using the AECC4CEPTMS functional, partially-fluorinated silane.

| Sample | EX-1 | EX-2 | EX-3 | CE-1 |
|---|---|---|---|---|
| Bonding after Post Cure | Pass | Pass | Pass | Pass |
| Bonding after Thermal Aging | Pass | Pass | Pass | Fail |

As shown in Table 4a, regardless of whether a functional, partially-fluorinated silane compound of the present invention is included in (i) only the silicone compound (EX-1), (ii) only the fluoropolymer composition (EX-2), or (iii) both the fluoropolymer and the silicone compositions (EX-3); the bond between the fluoropolymer and the silicone is improved after thermal aging as compared to when no such compound is used (CE-1).

TABLE 4b

Bonding results using the AECC3CEPTMS functional, partially-fluorinated silane.

| Sample | EX-4 | EX-5 | EX-6 |
|---|---|---|---|
| Fluoropolymer | FP-A1 | FP-B2 | FP-B 2 |
| Silicone | SP-B2 | SP-A1 | SP-B2 |
| Bonding after Post Cure | Pass | Pass | Pass |
| Bonding after Thermal Aging | Pass | Pass | Pass |

TABLE 4c

Bonding results using the AECC2CEPTMS functional, partially-fluorinated silane.

| Sample | EX-7 | EX-8 | EX-9 |
|---|---|---|---|
| Fluoropolymer | FP-A1 | FP-B3 | FP-B 3 |
| Silicone | SP-B 3 | SP-A1 | SP-B3 |
| Bonding after Post Cure | Pass | Pass | Pass |
| Bonding after Thermal Aging | Pass | Pass | Pass |

Again, as shown in Tables 4b and 4c, regardless of whether a functional, partially-fluorinated silane compound of the present invention is included in (i) only the silicone compound (EX-4 and EX-7), (ii) only the fluoropolymer composition (EX-5 and EX-8), or (iii) both the fluoropolymer and the silicone compositions (EX-6 and EX-9); the bond between the fluoropolymer and the silicone is improved after thermal aging as compared to when no such compound is used (CE-1).

What is claimed is:

1. A functional, partially-fluorinated silane compound according to Formula I:

$$X-O-R_1-R_f-R_2-O-(CH_2)_c-Si-Y_3 \quad (1)$$

wherein: X is $CH_2=CH-$ or $CH_2=CHCH_2-$;

$R_1$ and $R_2$ are linear or branched alkylenes having 1 to 4 carbon atoms;

$R_f$ is a perfluoro(alkylene) group having 1 to 8 carbon atoms and, optionally, at least one catenary heteroatom selected from the group consisting of O and N;

c is equal to the number of carbon atoms in X; and

Y is —Cl or —OR, wherein R is a linear or branched alkyl having 1 to 4 carbon atoms.

2. The compound of claim 1, wherein $R_1$ and $R_2$ are linear alkylenes, and the compound is a functional, partially-fluorinated silane compound according to Formula II:

$$X-O-(CH_2)_a-R_f-(CH_2)_b-O-(CH_2)_c-Si-Y_3 \quad (II)$$

wherein a and b are integers from 1 to 4.

3. The compound of claim 2, wherein a is equal to b.

4. The compound of claim 3, wherein a and b are both 1, and the compound is a functional, partially-fluorinated silane compound according to Formula III:

$$X-O-CH_2-R_f-CH_2-O-(CH_2)_c-Si-Y_3. \quad (III)$$

5. The compound of claim 1, wherein Y is $-O(CH_2)_x CH_3$, wherein x is an integer from 0 to 3.

6. The compound of claim 5, wherein x is 0, such that Y is $-OCH_3$.

7. The compound of claim 1, wherein X is $CH_2=CH-$.

8. The compound of claim 1, wherein X is $CH_2=CHCH_2-$.

9. The compound of claim 1, wherein $R_f$ is a linear or branched perfluoro(alkylene) group.

10. The compound of claim 9, wherein $R_f$ is a linear perfluoro(alkylene) group having the formula $(CF_2)_n$, wherein n is an integer from 1 to 4.

11. The compound 10, wherein X is $CH_2=CH-$ and n is 2 or 3.

12. The compound 10, wherein X is $CH_2=CH-CH_2-$ and n is an integer from 2 to 4.

13. An article comprising a first composition comprising a fluoropolymer, a second composition comprising a silicone polymer, wherein the second composition is in contact with and bonded to the first composition, wherein at last one of the first composition and the second composition comprises a functional, partially-fluorinated silane compound according to of claim 1.

14. The article of claim 13, wherein the first composition comprises at least a portion of the partially-fluorinated silane compound.

15. The article of claim 13, wherein the second composition comprises at least a portion of the partially-fluorinated silane compound.

16. The article according to claim 13, wherein the first composition comprises at least a portion of the partially-fluorinated silane compound, and the second composition comprises at least a portion of the partially-fluorinated silane compound.

17. The article of claim 13, wherein the fluoropolymer is a peroxide-curable fluoropolymer.

18. The article of claim 17, wherein the peroxide-curable fluoropolymer comprises a curesite group selected from the group consisting of Br, I, CN or a combination thereof.

19. The article of claim 13, wherein the article is a hose, an O-rings, a seal, a diaphragm, a valve, or a container, optionally wherein the hose is a turbo charger hose or a fuel line.

20. A method of preparing the functional, partially-fluorinated silane compound of claim 1, comprising:

(i) providing a partially-fluorinated dialkylene having the formula:

$$X-O-R_1-R_f-R_2-O-X$$

wherein X is $CH_2=CH-$ or $CH_2=CHCH_2-$;

$R_1$ and $R_2$ are linear or branched alkylenes having 1 to 4 carbon atoms; and $R_f$ is a perfluoro(alkylene) group having 1 to 8 carbon atoms and, optionally, at least one catenary heteroatom selected from the group consisting of O and N; and (ii) monohydrosilylating the partially-fluorinated dialkylene with trichlorosilane using a platinum catalyst to form a functional, partially-fluorinated, trichlorosilane compound

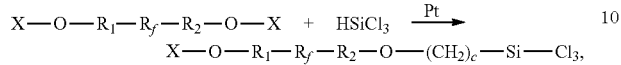

$$X-O-R_1-R_f-R_2-O-X + HSiCl_3 \xrightarrow{Pt}$$
$$X-O-R_1-R_f-R_2-O-(CH_2)_c-Si-Cl_3,$$

wherein c is equal to the number of carbon atoms in X.

21. The method of claim 20, wherein providing a partially-fluorinated dialkylene comprises reacting a diol having a formula H—O—$R_1$—$R_f$—$R_2$—O—H with a compound having a formula X—Z, wherein Z is selected from the group consisting of Br, Cl, I, and —OC(O)CH$_3$ to form the partially-fluorinated dialkylene having the formula X—O—$R_1$—$R_f$—$R_2$—O—X.

22. The method according to claim 20, wherein: $R_f$ is a linear perfluoro(alkylene) group having the formula $(CF_2)_n$, wherein n is an integer from 2 to 4; and $R_1$ and $R_2$ are —(CH$_2$)—.

* * * * *